Oct. 20, 1942.  G. Z. VON MANTEUFFEL  2,299,117
GYROSCOPIC DEVICE
Filed Nov. 24, 1937
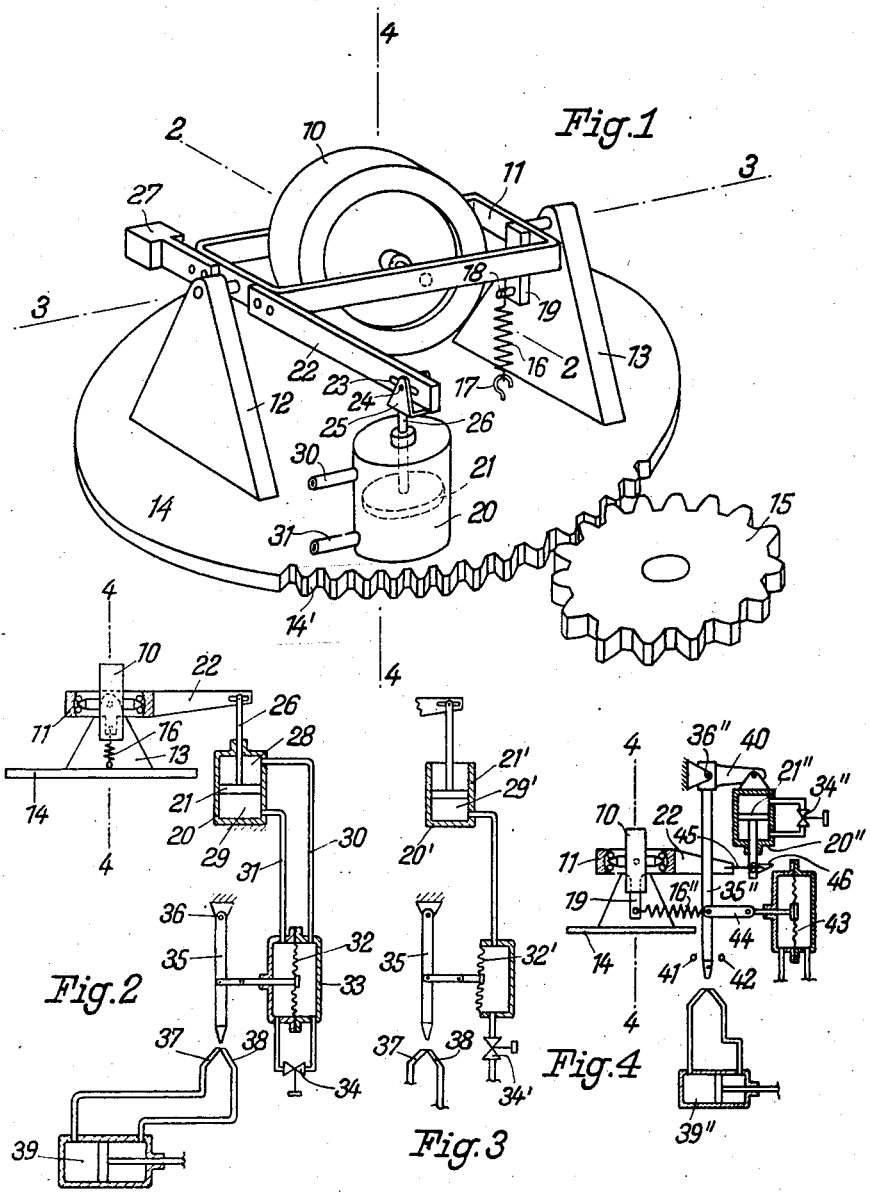
Inventor:
G. Z. von Manteuffel
By A. D. Adams
Atty.

Patented Oct. 20, 1942

2,299,117

UNITED STATES PATENT OFFICE 2,299,117

GYROSCOPIC DEVICE

Gert Zoege von Manteuffel, Berlin-Dahlem, Germany; vested in the Alien Property Custodian Application November 24, 1937, Serial No. 176,397
In Germany November 27, 1936

7 Claims. (Cl. 74—5)

This invention relates to gyroscopic devices, more particularly for use in automatic apparatus for controlling a condition. The control of a condition, broadly understood, may be the control of a pressure, temperature, humidity, flow, or the like or the control of the course or attitude of craft.

Referring to the control of craft it is a well-known fact that a craft changing its course or attitude will make a movement about an axis. It is an object of this invention to provide a simple and reliable gyroscopic apparatus responding to the rate or the rate of rate of movements about an axis and capable of actuating mechanism for effecting an adjustment of the course or attitude.

Referring to the control of physical conditions there has been disclosed in the copending application of Herbert Ziebolz, now Patent No. 2,195,351, dated March 26, 1940, how changes in physical conditions can be transformed into rotary movements to be impressed on gyroscopic devices responding to the rate or rate of rate of such movements. It is a further object of this invention to provide a reliable gyroscopic apparatus for use in control devices of the character disclosed in the aforesaid patent to Herbert Ziebolz.

Further aims, objects, and advantages of this invention will appear from a consideration of the description which follows with accompanying drawing showing for purely illustrative purposes embodiments of this invention. It is to be understood, however, that the description is not to be taken in a limiting sense, the scope of this invention being defined in the appended claims.

Referring to the drawing:

Fig. 1 is a perspective illustration of a form of gyroscopic device for use in this invention.

Fig. 2 is a diagrammatic illustration of a control device.

Fig. 3 shows in part a modified form of the control device illustrated in Fig. 2.

Fig. 4 is a diagrammatic illustration of another form of this invention.

A gyro rotor 10 is mounted for spinning about an axis 2—2 in a rotor bearing member 11. The rotor bearing member is pivoted for movement about an axis 3—3 normal to the axis 2—2 in standards 12 and 13 secured to or integral with a support 14, the latter being movable about an axis 4—4. For the purpose of rotating the support about the axis 4—4 the support is shown as having a toothed circumference 14' meshing with a pinion 15.

When the support 14 is rotated about the axis 4—4, the gyroscope is caused to precess according to well-known laws of physics. The force of precession is proportional to the rate of the movement impressed upon the gyroscope about the axis 4—4. In order to obtain an angular inclination of the rotor bearing member with respect to the support which is proportional to the rate of angular movement impressed upon the gyroscope, a spring 16 may be connected to the support and the rotor bearing member. An eye 17 at the support and a pin 18 connected to an arm 19 of the rotor bearing member 11 is shown for this purpose. As the force of the spring increases linearly with its distortion, it follows that the angle of inclination of the rotor bearing member can be made proportional to the precessional force of the gyroscope and proportional to the rate of angular movement about an axis 4—4. The force of the spring in this instance will be a measure of the rate of angular movement.

For deriving an impulse from the gyroscopic device in response to the rate of rate of angular movements impressed upon the gyroscope there is shown a means for creating a differential pressure such as a pump comprising a cylinder 20 mounted on the support 14 and a piston 21 movable therein, the parts being connected to be actuated upon precessional movements of the gyroscope. In the illustrated example an arm 22 is connected to the rotor bearing member. The arm has an elongated slot 23 engaging a pin 24 in a forked end 25 of a piston rod 26. The arm 22 and piston 21 are counter-balanced by means of a weight 27. It is to be understood that the piston pump is shown for illustrative purposes only and that any other type of pump or device may be substituted for the piston pump, the idea being that a force is exerted by said pump or device which is a function of the precessional movements of the gyroscope.

Referring now to Fig. 2 the gyroscopic device and the force exerting means are diagrammatically shown in this figure. Chambers 28 and 29 formed by the cylinder 20 and piston 21 are connected through conduits 30 and 31 with a differential pressure responsive device, in the illustrated example a diaphragm 32 enclosed in a casing 33.

Means are associated with the force exerting device for diminishing the force exerted by the same according to a function of time. In this example, there is shown a throttle 34 connecting both sides of the diaphragm 32, or the chambers 28 and 29, respectively.

When the gyroscope precesses, thereby tilting the rotor bearing member 11 about the axis 3—3, the piston 21 will be displaced relatively to the cylinder 20 and a flow started through the conduits 30 and 31. When the precessional movement is slow, the throttle 34 will offer no considerable resistance to the small flow created in response to the precessional movement. Accordingly, only a small force will be exerted on the diaphragm 32, as the pressure is quickly equalized through the throttle. When, in turn, the precessional movement of the gyroscope is fast, a great flow will be set up through the conduits 30 and 31 which takes considerable time to become equalized through the throttle and a great differential pressure on the diaphragm 32 will result. It thus appears that the pressure on the diaphragm 32 will become a measure of the rate of the precessional movement of the gyroscope and, correspondingly, the rate of rate of angular movements impressed on the gyroscope about the axis 4—4.

A relay may be actuated by the diaphragm 32. In the illustrated example, a pressure fluid relay of the jet-pipe type is shown including a jet-pipe 35 pivoted at 36 and supplied with pressure fluid from a suitable source (not shown). A jet of pressure fluid is issued from the jet-pipe into orifices 37 and 38 and pressures set up therein depending upon the degree in which the orifices and the jet-pipe nozzle register. A servo-motor 39 connected to the orifices 37 and 38 will accordingly be moved in response to the differential pressure in the reception orifices which motion is, in turn, a function of the rate of rate of movements impressed on the gyroscope about the axis 4—4.

The servo-motor 39 may be connected to a rudder, when the device is used on board craft for purposes of automatic steering. When the device is employed for controlling physical conditions, the servo-motor will be connected to a condition adjusting device, such as a valve or the like. My invention may also be described from a somewhat different standpoint. The jet pipe 35 and the receiving orifices 37, 38 really constitute a pick-off device or controller responsive to the precessional movements of the gyroscope, and my invention comprises interposing between such pick-off or controller and the gyroscope bearing frame 11 a fluid pressure system which in this instance includes both the pressure generating means and the pressure responsive means 33, and in which system is provided a slow leak or restricted bypass 34 whereby the movements of the jet pipe are responsive primarily to the rate of change of precession of the gyroscope and, therefore, responsive to the angular acceleration of the platform or ship on which the gyroscope is mounted.

A modified form of the device shown in Fig. 2 is illustrated in Fig. 3. In this embodiment in place of a differential pressure exerting cylinder and piston a differential pressure diaphragm kind of pump 20', 21' having only one chamber 29' is employed together with a diaphragm 32' responding to pressures created by the pump. A throttle 34' connects the interior of the diaphragm chamber with the atmospheric air, it being understood that in place of the throttle a bleeder hole in the cylinder 20' or the piston 21' may be used or simply a piston having a certain play in the cylinder and permitting a certain amount of fluid to pass between the cylinder walls and the piston.

When the gyroscopic device is used on board ship, the support 14 is to be connected with the body of the ship to be moved therewith. The device will accordingly respond to angular accelerations about axes parallel to the axis 4—4, the cylinder and piston in combination with the throttle valve 34' acting as an energy absorbing device which therefore damps the precessional movements of the gyroscope. When the device is used for controlling physical conditions as disclosed in the aforesaid Ziebolz patent, the support 14 is to be rotated in response to condition changes as disclosed in detail in said patent.

Another form of this invention is shown in Fig. 4. The arm 22 of the rotor bearing member 11 is connected to a piston 21" movable in a cylinder 20". A throttle 34" is connected to by-pass the cylinder chambers for the purpose of diminishing according to a function of time pressure forces acting on the cylinder and piston and thus constituting a damping means. In counterdistinction to well known devices of this kind serving to damp precessional oscillation of the gyroscope, the cylinder 20" is not fastened to the support 14 but is mounted on arm 40 of relay 35. The jet-pipe relay 35" which is pivoted about an axis 36" is movable between stops 41 and 42 and actuates in a well-known manner a servo-motor 39". When the gyroscope precesses, a force will be exerted on the relay 35" which is a function of the rate of rate of angular movements about the axis 4—4.

For actuation of the relay in further response to the rate of angular movements a spring 16" is connected between the arm 19 of the rotor bearing member 11 and the movable jet-pipe 35". For reasons hereinbefore outlined the tension of the spring is proportional to the rate of angular movements about the axis 4—4.

Further controlling impulses may be impressed upon the relay, a differential pressure diaphragm 43 being shown for this purpose connected to the jet-pipe through a link 44. The differential pressure diaphragm may be acted upon by an impulse pressure which is a function of the condition change. Reference for particulars in this respect may be had to the aforesaid Ziebolz patent. In order to permit a slight movement of the diaphragm 43 and the jet-pipe 35" without affecting the gyroscope, the connection between the arm 22 of the rotor bearing member and the piston 21" may be made resilient, a flat spring 45 guided between pins 46 being shown for this purpose.

The device shown in Fig. 4 constitutes a simple and reliable apparatus for effecting a stable control of a condition, free from "hunting" and "overshooting" in that the control is effected not only in response to condition changes, but also to the rate of change and the rate of rate of change. The support 14 of the device as explained in connection with Fig. 2 is to be mounted to move with a craft or in response to condition changes. Thus, when the invention is employed for the control of the course of a craft, i. e., in automatic steering, the pressure lines leading to the opposite sides of diaphragm 43 would be controlled by changes in heading from any known position maintaining means. Thus we have acting on the relay or jet pipe 35" three controls, one responsive to displacement, a second responsive to angular velocity, and a third responsive to the angular acceleration of the craft or other support. It may be noted that in the forms of the invention shown in Figs. 3 and 4 as well as in Fig. 2, I again insert between the controller or pick-off device, constituting the jet pipe 35 or 35", and the gyroscope a fluid pressure system provided with a slow leak, the system constituting in Fig. 4, a piston 22" and cylinder 20" with the by-pass throttle 34", and that this device again serves as the means for controlling the servo motor 39" in accordance with the rate of change of precession of the gyroscope.

Obviously, the present invention is not restricted to the particular embodiments herein shown and described. Moreover, it is not indispensable that all the features of this invention be used conjointly, since they may be employed advantageously in various combinations and subcombinations.

I claim:

1. A gyroscopic device comprising, in combination, a rotor bearing member mounted for movement about a first axis, a gyro rotor mounted in said member for spinning about a second axis normal to said first axis, a relay, a motion transmitting device operatively connecting said member and relay including cylinder means and piston means therefor, mechanism operatively connecting one of said means to said bearing member and the other of said means to said relay for actuation of the relay in response to precession of the bearing member about the first axis, said mechanism including a spring, and a leak in said cylinder means for permitting the effective pressure acting between the cylinder and piston to become diminished according to a function of time.

2. A gyroscopic device comprising, in combination, a rotor bearing member mounted for movement about a first axis, a gyro rotor mounted in said member for spinning about a second axis normal to said first axis, a relay, a force transmitting device including cylinder means and piston means therefor, mechanism operatively connecting one of said means through a spring to said rotor bearing member and the other of said means to said relay for actuation of the relay in response to movements of the bearing member about the first axis, a leak communicating with said cylinder means for permitting a pressure acting on the same to become diminished according to a function of time, a second spring directly connecting said bearing member and said relay, and yielding means opposing movement of the relay.

3. A gyroscopic device comprising, in combination, a support which may be oriented or angularly displaced about an axis, a rotor bearing member mounted on said support for precession about a second axis normal to said first axis, a gyro rotor mounted on said member for spinning about a third axis normally normal to said other axes, a relay, a force transmitting device including cylinder means and piston means therefor, mechanism, including a spring, operatively connecting said piston means to said rotor bearing member and said cylinder means to said relay for actuation of the relay in response to precession of the bearing member about the second axis, and a leak within said cylinder means for permitting a pressure acting in the same to become diminished according to a function of time, whereby the relay will be actuated in response to the angular acceleration of said support.

4. A gyroscopic device comprising, in combination, a support which may be oriented or angularly displaced about an axis, a rotor bearing member mounted on said support for movement about a first axis, a gyro rotor mounted in said member for spinning about a second axis normally normal to said first axis, a relay, a force transmitting device including cylinder means and piston means therefor, mechanism operatively connecting said piston means through a spring to said rotor bearing member and said cylinder means to said relay for actuation of the relay in response to movements of the bearing member about the first axis, a leak in said cylinder means for permitting a pressure acting on the same to become diminished according to a function of time, and resilient means operatively connecting said bearing member and said relay for actuation of the relay in response to movements of the member about the first axis, whereby the relay will be actuated in response to the second and first derivative with regard to time of angular movements affecting said support and causing the gyroscope to precess.

5. In a means for maintaining a condition against departure therefrom, such as maintaining the course of a craft, a servo motor for causing turning, a master relay for actuating the servo motor, and a plurality of devices for controlling said relay in accordance with angular displacement from course, rate of angular displacement and angular acceleration, including a rate-of-turn type gyroscope having a rotor bearing member mounted for precession on turning of the craft, a force transmitting device including cylinder means and piston means therefor, mechanism for operatively connecting one of said means to the rotor bearing member of said gyroscope and the other of said means to said relay to actuate said relay in response to precession of said gyroscope, a leak in said cylinder means for permitting pressure acting on the piston to become diminished according to a function of time, a direct spring connection from the rotor bearing member of said gyroscope to said relay, and a third means connected to said relay, responsive to displacement of said craft, whereby said relay is actuated in response to displacement, rate of displacement, and angular acceleration of the craft.

6. Gyroscopic device comprising, in combination, a rotor bearing member mounted for movement about a first axis; a gyro rotor mounted in said member for spinning about a second axis normal to said first axis; a relay; force exerting means operatively connecting said bearing member and said relay for actuation of the latter in response to movements of the former about the first axis; and means associated with said force exerting means for reducing forces exerted by the latter according to a function of time, whereby the relay will be actuated in response to the rate of rate of angular movements acting on the gyroscope and causing the same to precess.

7. Gyroscopic device comprising, in combination, a support; a rotor bearing member mounted on said support for movement about a first axis; a gyro rotor mounted in said member for spinning about a second axis normal to said first axis; a relay; force exerting means operatively connecting said bearing member and said relay for actuation of the latter in response to movements of the former about the first axis; means associated with said force exerting means for reducing forces exerted by the latter according to a function of time, and resilient means operatively connecting said bearing member and said relay, whereby the relay will be actuated in response to the second and first derivative with regard to time of angular movements acting on said support and causing the gyroscope to precess.

GERT ZOEGE von MANTEUFFEL.